(12) United States Patent
Iliev et al.

(10) Patent No.: US 7,999,751 B2
(45) Date of Patent: Aug. 16, 2011

(54) MAGNETICALLY COUPLING NEAR-FIELD RFID ANTENNA

(75) Inventors: Stoyan Iliev, Kirchseeon (DE); Thomas Lankes, Rosenheim (DE); Gerald Schillmeier, München (DE)

(73) Assignee: Kathrein-Werke KG, Rosenheim (DE)

( * ) Notice: Subject to any disclaimer, the term of this patent is extended or adjusted under 35 U.S.C. 154(b) by 285 days.

(21) Appl. No.: 12/433,976

(22) Filed: May 1, 2009

(65) Prior Publication Data

US 2010/0277386 A1  Nov. 4, 2010

(51) Int. Cl.
*H01Q 7/06* (2006.01)
(52) U.S. Cl. ......... 343/788; 343/741; 343/787; 343/866
(58) Field of Classification Search ............... 343/700, 343/788, 787, 741, 742, 866, 867
See application file for complete search history.

(56) References Cited

U.S. PATENT DOCUMENTS

| | | | |
|---|---|---|---|
| 1,381,089 A | 6/1921 | Beverage | |
| 3,605,097 A | 9/1971 | Hadik | |
| 3,717,876 A * | 2/1973 | Volkers et al. | 343/712 |
| 3,719,950 A * | 3/1973 | Bukhman et al. | 343/788 |
| 4,101,899 A * | 7/1978 | Jones et al. | 343/788 |
| 5,198,826 A * | 3/1993 | Ito | 343/726 |
| 6,597,318 B1 * | 7/2003 | Parsche et al. | 343/700 MS |
| 7,446,729 B2 * | 11/2008 | Maruyama et al. | 343/867 |
| 2001/0035842 A1 | 11/2001 | Apostolos | |
| 2007/0268143 A1 | 11/2007 | Copeland et al. | |
| 2008/0048867 A1 | 2/2008 | Oliver et al. | |
| 2008/0136730 A1 | 6/2008 | Chen | |
| 2009/0015480 A1 | 1/2009 | Shafer et al. | |

FOREIGN PATENT DOCUMENTS

| | | |
|---|---|---|
| DE | 3529914 C2 | 3/1987 |
| EP | 1528621 A1 | 5/2005 |
| GB | 2 263 360 A | 7/1993 |
| GB | 2431053 A | 4/2007 |

OTHER PUBLICATIONS

Citation by Examiner in the corresponding German examination proceedings, 10 2009 019 546.7-35, 3 pages (Mar. 25, 2010).
Daniel M. Dobkin, Steven M. Weigand and Nathan Iye, "Segmented Magnetic Antennas for Near-field UHF RFID," Microwave Journal and Horizon House Publications, vol. 50, No. 6 (Jun. 6, 2007).
Qing, Xianming, et al., "Characteristics of a Metal-Backed Loop Antenna and its Application to a High-Frequency RFID Smart Shelf," IEEE Antennas and Propagation Magazine, vol. 51, No. 2 (Apr. 2009).
International Search issued in corresponding PCT application PCT/EP2010/002480 (Aug. 26, 2010).

* cited by examiner

*Primary Examiner* — David G Phan
(74) *Attorney, Agent, or Firm* — Nixon & Vanderhye PC

(57) ABSTRACT

An improved magnetically coupling near-field RFID antenna is embodied as a magnetic H-field coupler, and the near-field RFID antenna is embodied as a looped and/or frame-shaped antenna. The looped and/or frame-shaped antenna comprises a looped or frame-shaped strip conductor. The strip conductor is arranged set apart from a ground surface parallel thereto. A dielectric is interposed. The start and the end of the strip conductor end close to each other forms a gap or spacing. The start of the strip conductor is fed to ground. The end of the strip conductor is terminated by a terminating resistor. The terminating resistor is connected between the end of the strip conductor and a ground surface.

12 Claims, 3 Drawing Sheets

MAGNETICALLY COUPLING NEAR-FIELD RFID ANTENNA

CROSS REFERENCE TO RELATED APPLICATIONS

FIELD

The invention relates to a magnetically coupling near-field RFID antenna as claimed in the pre-characterizing clause of claim 1.

BACKGROUND AND SUMMARY

Contactless identification systems with contactless transmission of energy and data from a data transmission/reception device to a portable data carrier via an electrical, magnetic or electromagnetic alternating field are well known. In particular what is known as radio frequency identification (RFID) offers a possibility to contactlessly read out information located on portable data carriers or to write data thereto. Starting therefrom, RFID technology opens up a large number of possible applications; for example, it opens up possibilities for permanently checking whether for example specific goods or products are present in warehouses during production sequences or whether specific goods having specific equipment features are present at specific locations.

RFID systems have a plurality of basic components and technical properties by which they are defined. Generally provided is what is known as a reading apparatus, or reader for short, which is connected to an antenna. The reading apparatus emits a corresponding interrogation signal via the antenna. This signal, which is received by a tag, serves at the same time to supply energy to the tag. The corresponding information is read out on the tag and returned to the transmission/reception apparatus, known as the reader, which picks up and evaluates the corresponding signal via the antenna. The path is in this case a bidirectional transmission/reception path in an identical frequency range or frequency band. For this purpose, different frequency bands may be cleared in the different countries for this technology.

The aforementioned tags conventionally comprise, in addition to a substrate, for example in the form of an optionally flexible film, a data carrier antenna and also an associated circuit arrangement (chip) in which is stored the corresponding information which can be read out after reception of a signal.

In RFID technology, different types of tags and, depending on the types of tags, to some extent also different reception methods (some of which are also frequency-dependent) have become known.

The corresponding transponders, referred to hereinafter also as tags for short, differ for example in terms of the transmission frequency, but also in terms of their purpose of use.

For example, dipolar tags have become known, which draw the energy irradiated by the reader, above all from the E-field or a combination of the E and the H-field, i.e. the electromagnetic field.

In addition, somewhat small looped tags have become known, which are coupled primarily by the H-field, i.e. the magnetic field.

In addition, there are also mixed forms of transponders, i.e. tags.

Just as the tags differ from one another, i.e. in terms of whether the tags are oriented primarily to the reception or the emission of E-fields, of H-fields or to the combination, the antenna designs for RFID readers also differ from one another.

Thus, the RFID antennas which are conventionally used are patch antennas. Antennas of this type conventionally have very low selectivity in their near range.

In addition, loop antennas, in particular large loop antennas, have become known, which are suitable above all for transmission and reception by means of magnetic fields.

Thus, for example, according to US 2008/0048867 A1, the use of a somewhat rectangular or circular RFID antenna has become known, which is fitted in its circumferential direction with one or more capacitors. Ultimately, the capacitors can also be fitted by way of an interruption or a plurality of interruptions in the circumferential direction of the antenna which is, for example, in principle somewhat circular in its configuration. An antenna of this type is intended to be suitable, in particular, as a UHF RFID antenna generating a magnetic coupling to tags located in the antenna region. Nevertheless, antennas of this type generate not inconsiderable electromagnetic radiation perpendicularly to the axis of the loop, as in dipoles. In addition, in antennas of this type, a reflector has to be used in order to achieve an improvement. For this reason too, the antenna produces overall a comparatively large design, partly owing to the necessary spacing between the loop antenna and the reflector. In this case, according to this prior publication, the aim is to generate loop antennas of the type in which the length of the loop portions, which are separated from one another in each case via a capacitor, can be longer than the wavelength of the excitation signal.

A further segmented loop antenna has also become known from the publication "Segmented Magnetic Antennas for Near-field UHF RFID", Microwave Journal and Horizon House Publications, Vol. 50, No. 6 June 2007. The antenna has in principle a polygonal shape and is highly segmented. Each individual segment is formed from a metal line comprising a capacitor, which is connected in series, relative to the next segment. This publication discloses as being known, for example, an eight-polygonal antenna with six capacitors or, for example, a sixteen-polygonal antenna with fifteen capacitors at a magnitude of 1 pF and a resistance of 10Ω.

Finally, antenna designs have also become known, in which antennas are constructed on the basis of a microstrip line. This may be taken to be known, for example, from US 2007/0268143 A1. Antennas of this type possess lengths of $\geq \lambda/2$ and are used to implement an E-field coupling. Typically, the length of an antenna of this type is greater than $\lambda/2$ (based on the operating frequency) and less than $\lambda$ (wherein $\lambda$ is the wavelength in the dielectric).

Antennas of this type can be embodied as non-radiating antennas, for example in the form of meander line antennas. A meander line antenna of this type is arranged on the surface of a substrate (above a ground surface) the meander line antenna being fed at one end and terminated at its opposite end using a resistor which is connected to ground.

In an antenna construction of this type, E-field coupling can be used to read out, for example, labels which are provided with suitable tags and are moved directly adjacently beyond the antenna in question.

Against this background, it is the object of the present invention to provide an improved magnetically coupling near-field RFID antenna which has a design which is as small as possible and causes in this case as little power irradiation as possible in order to ensure, in this way too, high selectivity, thus ensuring in the immediate near field of a tag passed by the antenna that at all times only a single tag located directly in the antenna region can be read out.

According to the invention, the objective is achieved in accordance with the features specified in claim 1. Advantageous configurations of the invention are specified in the sub-claims.

Within the scope of the solution according to the invention, a near-field RFID antenna is proposed, in which power irradiation is reduced to a minimum. In other words, it is possible to ensure within the scope of the invention that for example less than 20%, in particular less than 15%, 10% or even less than 8%, 6%, 4% or even 2% of the power is irradiated.

The antenna according to the invention is in this case optimized for magnetic tags, i.e. for tags which are fed and addressed primarily via the magnetic field. In this case, the antenna according to the invention generates in the near field a strong H-field.

The antenna according to the invention has in this case a loop shape which, in terms of basic shaper can readily vary in regions, for example can be circular, oval, square or somewhat rectangular, n-polygonal or the like in its configuration. The key aspect is that the antenna means, which is referred to as a looped antenna, is returned from a feed point via a closed path as close as possible to the feed point and terminated there to ground via a terminating resistor.

The near-field RFID antenna according to the invention consists of a microstrip line which is fed at one end and is terminated at the other end by the line impedance. As a result, it is possible to generate a purely progressive wave. The length L of the strip conductor of the frame-shaped antenna is in this case less than $\lambda/2$ (wherein $\lambda$ is the wavelength, i.e. the operating wavelength in the dielectric). Preferably, the length is less than $\lambda/3$.

The gap between the feed point and terminating resistor is in this case ideally as small as possible, regardless of how the strip line frame antenna is specifically shaped, i.e. whether it is somewhat circular, elliptical, rectangular, etc. in its configuration. In this way, it is possible to make the direction of flow at a specific point in time uniform in all cases on the entire line, thus effectively strengthening the magnetic field and reducing the electrical field.

A further advantage of the antenna according to the invention over large magnetic (segmented) antennas consists in its broadband nature with respect to adaptation. One reason for this is the non-resonant structure of the antenna construction according to the invention.

BRIEF DESCRIPTION OF THE DRAWINGS

The invention will be described in greater detail hereinafter with reference to drawings, in which specifically.

DETAILED DESCRIPTION

Figure 1:
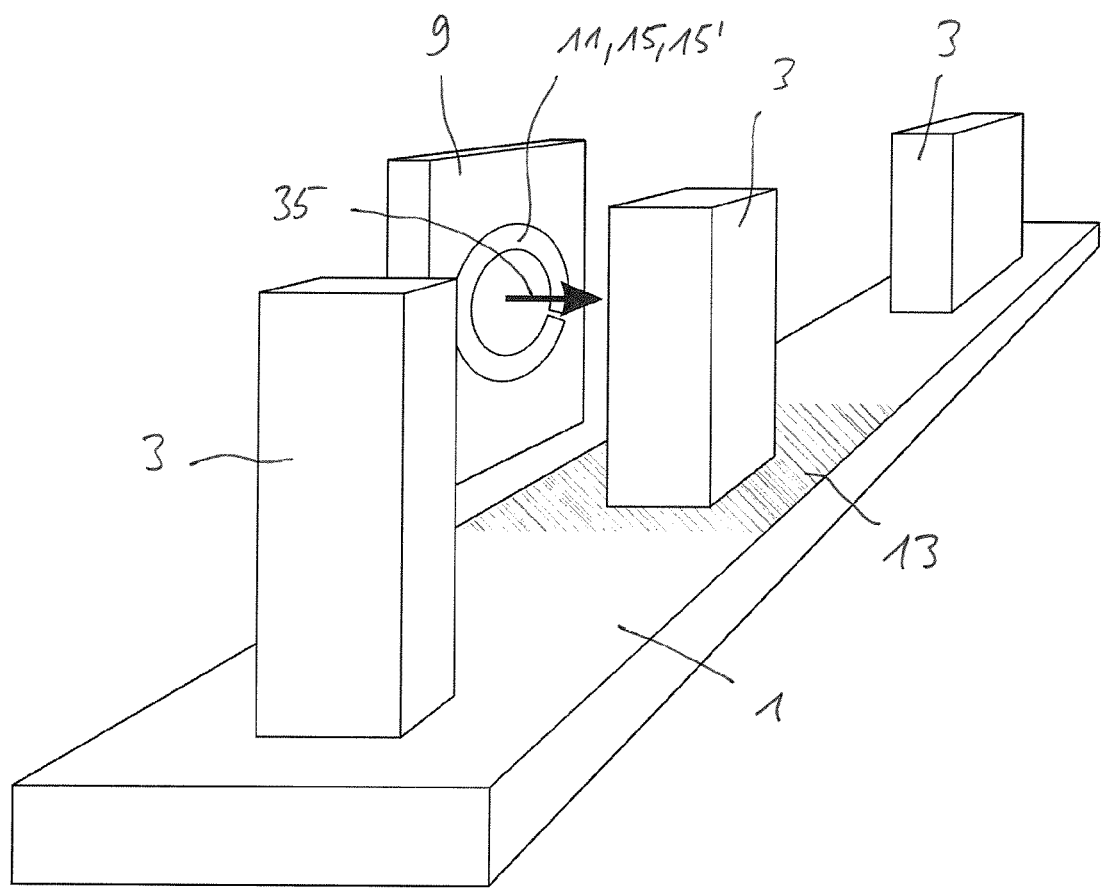
FIG. 1 is a schematic spatial view of certain objects which, set apart from one another, are moved past a near-field RFID antenna.

FIG. 1 represents schematically, by way of example, a type of conveyor belt or transport path along which it is possible to move a plurality of objects 3 which are set apart from one another on the conveyor belt 1.

Each of these objects 3 is to be provided with a tag (transponder) consisting preferably of a passive transponder, i.e. a passive tag, which receives the required energy only from the magnetic antenna field and, with the aid of this energy, can then read out the information stored in the tag and send it to the RFID antenna of the reader.

Furthermore, FIG. 1 shows in this case a magnetically coupling near-field antenna 11, which is associated with a reader, according to an exemplary embodiment according to the invention, the individual objects 3 being successively moved past the near-field antenna 11 in close proximity on the conveyor belt/transport path 1 in order to read out the information stored on the tag. The near-field antenna 11 defines in this case a narrowly demarcated reading region 13, so that in all cases only an object located in the reading region 13 can ever be identified based on the tag located thereon.

The antenna is highly selective so that in each case only a tag located in direct proximity to the near-field antenna 1, can be read out, that is to say, in the reading region 13 represented in FIG. 1. The objects which are located outside the reading region and have the separate tags cannot be read out.

The magnetically coupling near-field antenna according to the invention consists, in the exemplary embodiment shown, of a looped or frame-shaped structure 15 which, in the exemplary embodiment shown, is embodied as a strip line. The associated strip conductor 19 is constructed on the upper side 21a on a substrate or dielectric 21. The dielectric can then have in this case the electricity value $\in_r$ of for example more than 2, 3, 4, 5, 6, 7, 8 or 9 or else values of less than 10, 9, 8, 7, 6, 5, 4 or 3, 2. Preferably, the substrate 21 used is the material FR4, the $\in_r$ of which lies typically between 4.0 and 4.7.

In particular when using a substrate 21 made of FR4, it has been found to be advantageous if the wave resistance of the strip line is 50 ohms or approx. 50 ohms.

On the substrate or dielectric 21 thus described or in the case of air as the dielectric using a supporting and holding construction, there is then provided on the upper side of the dielectric the associated strip conductor 19 which, according to the first exemplary embodiment, is embodied so as to extend in a precisely circular manner, at a radius R. Ultimately, the maximum radius R of the looped or frame-shaped antenna is determined by the wavelength in the dielectric. The circumference of the looped or frame-shaped antenna is in this case to be less than $\lambda/2$. Typically, this circumference U will be less than or equal to $\lambda/3$.

If the antenna is to be operated, for example, at 865 MHz and on a substrate wherein $\in_r=1$ (air), this would mean that—if the circumference is to be less than $\lambda/2$—this circumference is ultimately to have a value of less than 17.3 cm.

In the preferred range, this circumference is, as mentioned, to be less than $\lambda/3$, i.e. less than or equal to 11.6 cm. In other words, this results in a radius which is less than or equal to 2.7 cm and is preferably less than or equal to 1.9 cm.

Theoretically, the radius could be minimized, i.e. tend toward 0. Nevertheless, this would excessively reduce the size of the reading field, i.e. the reading range. A value of about 5 mm can therefore be designated as the minimum radius.

The exemplary embodiment shown results in the strip line 19 being fed at one end 19a to ground, for which purpose there is provided in the substrate a hole or recess 23 which extends perpendicularly thereto and is in alignment with a corresponding hole or recess 23' in the ground surface 25 located on the underside of the substrate/dielectric 21.

As a result, a feed line 27 runs to a contact point at the direct end 19a of the strip line 19.

The opposite second end 19b of the strip line 19 is terminated by a terminating resistor 29, i.e. by a resistor corresponding to the line impedance.

The gap or spacing 31 formed between the two ends 19a and 19b of the strip conductors 19 is in this case to be as small as possible. The size of the gap or spacing 31 between the starting point and the end point 19a, 19b of the strip line 19 is in this case to be preferably less than 10% and in particular less than 5%, 4%, 3%, 2% or even less than 1% of the total length of the strip lines 19.

The aforementioned terminating resistor 29 is in this case connected to the ground surface 25, which is located on the underside 21b of the substrate 21, via one or more through-contacts 33.

It would also be possible for a short line to be guided from the end 19b of the strip line 19 to the underside 21b of the substrate/dielectric 21, for example also by means of a through contact, a sufficient (small) aperture being provided on the underside of the substrate or dielectric 21 in the ground surface 25, wherein in this aperture in the ground surface the resistor can then be embodied for terminating the strip conductor 19 on the underside 21b of the substrate/dielectric 21, which resistor is then connected there directly to ground 25 via one or more lines.

Figure 2:
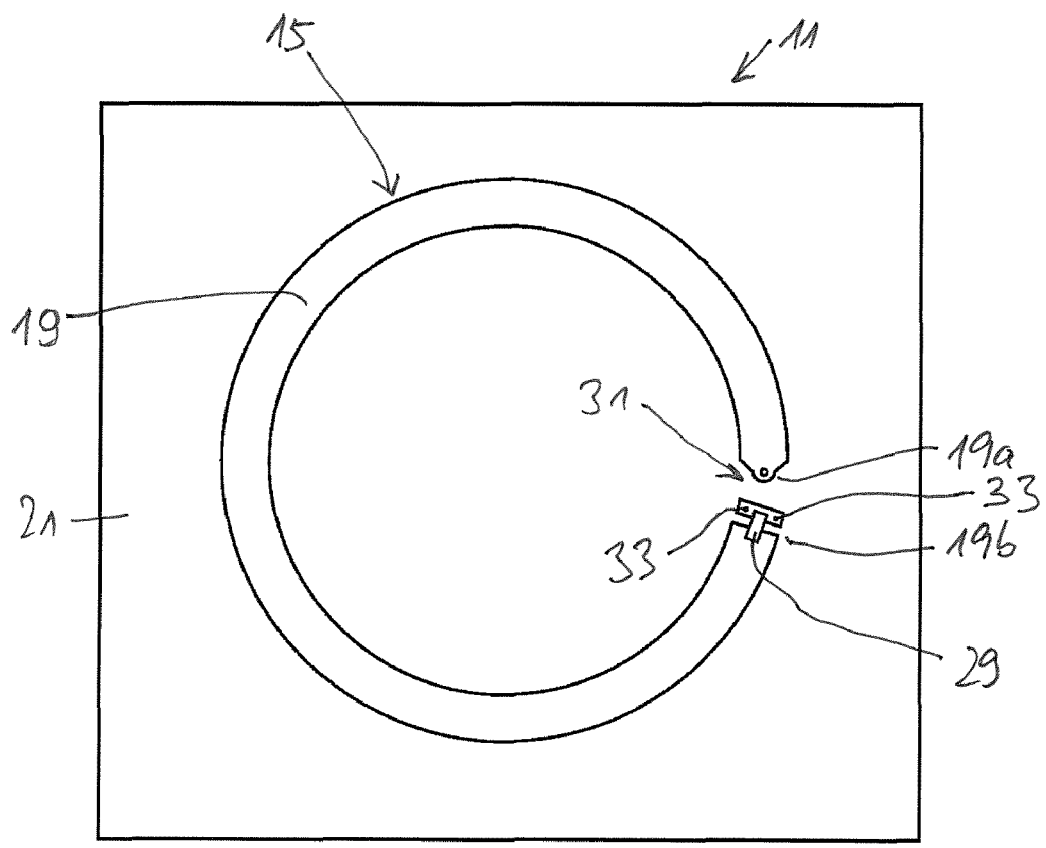
FIG. 2 is a schematic plan view onto a first exemplary embodiment of a near-field RFID antenna of a reader.
Figure 3:
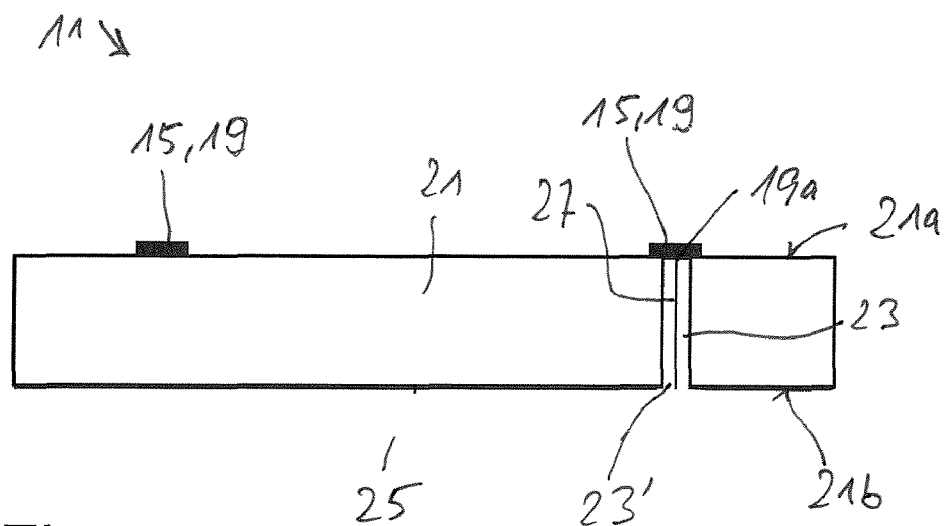
FIG. 3 is a schematic cross-sectional view through this exemplary embodiment according to FIG. 2.

In the exemplary embodiment shown, the strip line 19 is configured in a circular manner in accordance with FIG. 2.

Figure 4:
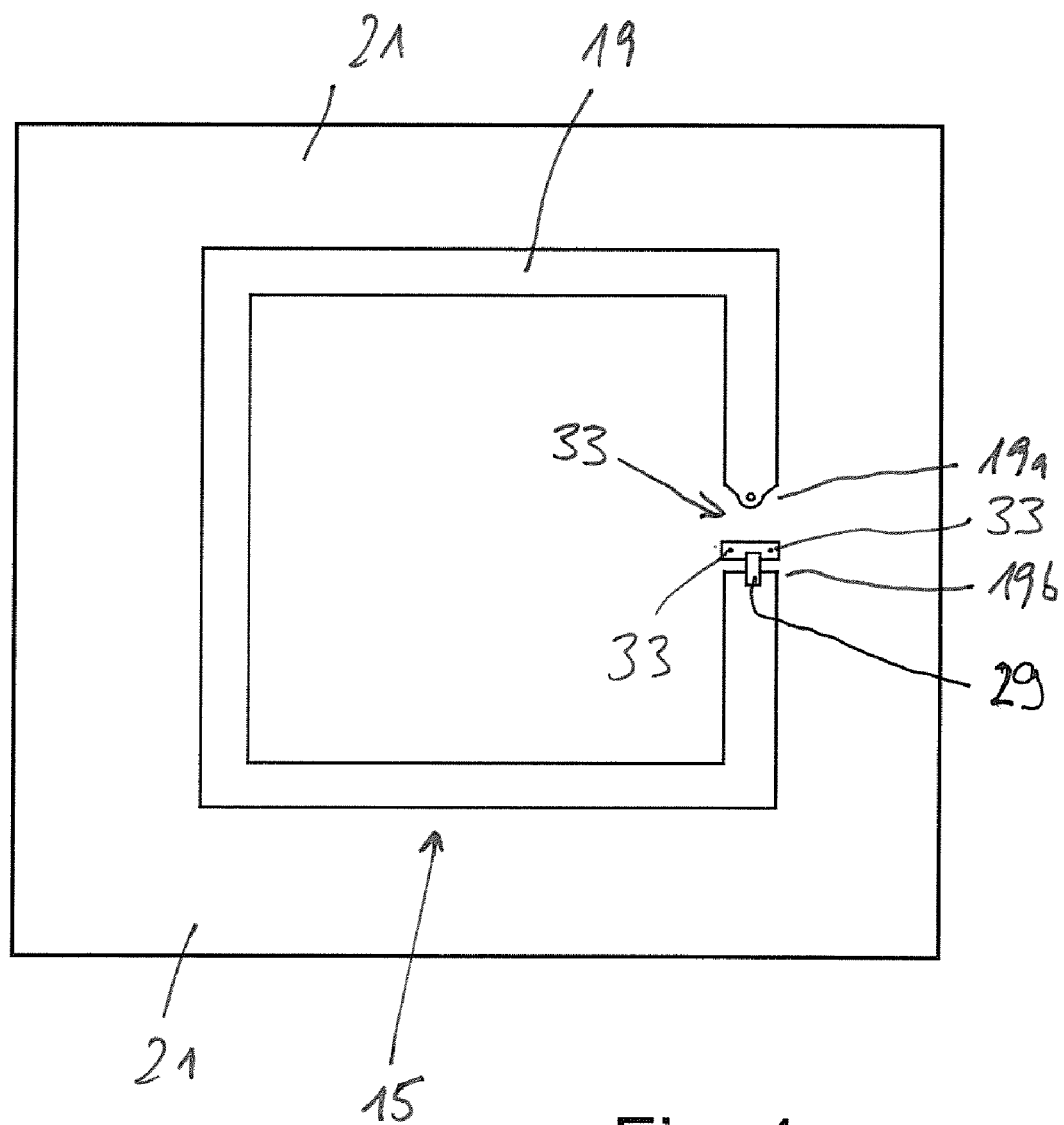
FIG. 4 shows an exemplary embodiment differing from FIG. 2.

However, the looped or frame-shaped strip conductor antenna can also have shapes differing therefrom, for example be configured so as to be oval, rectangular or square, generally n-polygonal in its configuration. FIG. 4 shows a differing embodiment of the invention in which, for example, the strip conductor antenna 15 represents, viewed from above, a strip conductor extending in a square manner. However, in this case too, the spacing between the starting point and the end point 19a, 19b of the strip conductor 19 is configured so as to be as small and narrow as possible, so that, in this case too, this spacing has preferably less than 10%, i.e. less than 8%, 7%, 6%, 5%, 4%, 3%, 2% or even less than 1% of the total length of the strip conductor 19. Straight and/or curved portions can be joined together. All that matters is that a peripheral strip line is provided, the start 19a and end 19b of which are as close together as possible. Ultimately, this ensures that an antenna of this type, as is shown above all in the arrow direction 35 in FIG. 1, generates a magnetic H-field without electromagnetic energy being irradiated in the relevant manner. It is thus possible to ensure, within the scope of the invention, that for example less than 20%, in particular less than 15%, 10% or even less than 8%, 6%, 4% or even 2% of the power is irradiated. This provides a highly selective magnetically coupling near-field RFID antenna which is active only in the region directly adjacent to the antenna and which ensures that in each case only a closest tag can be read out.

Furthermore, it is in this case ensured that no or only minimal electromagnetic energy is introduced onto the product provided with the tag; this is desirable in many applications including, for example, in the medical or pharmaceutical field.

The antenna according to the invention is suitable in particular for a frequency range of from 800 MHz to 1 GHz, for example the range from 865 MHz to 870 MHz. It can however also be used, for example, in the range of from 900 MHz to 930 MHz.

The exemplary embodiment has been described with reference to a dielectric substrate. However, air can also serve as the dielectric. In this case, the strip conductor 19 would have to be secured and held by a suitable supporting construction, set apart before a ground surface 25.

The invention claimed is:

1. A magnetically coupling near-field RFID antenna comprising:
    a magnetic H-field coupler,
    a looped and/or frame-shaped antenna comprising a looped or frame-shaped strip conductor,
    the strip conductor arranged set apart from a ground surface parallel thereto, a dielectric being interposed,
    the start and the end of the strip conductor end close to each other forming a gap or spacing,
    the start of the strip conductors being fed to said ground surface,
    the end of the strip conductors being terminated by a terminating resistor,
    the terminating resistor being connected between the end of the strip conductor and said ground surface.

2. The near-field RFID antenna as claimed in claim 1, wherein the dielectric is formed from a substrate.

3. The near-field RFID antenna as claimed in claim 2, wherein the dielectric has an $\in_r$ which is greater than or equal to 1 and less than 10.

4. The near-field RFID antenna as claimed in claim 2, wherein the substrate comprises FR4 and/or wherein the substrate comprises a dielectric having a dielectric constant $\in_r$ lying between 4.0 and 4.7.

5. The near-field RFID antenna as claimed in claim 1, wherein the radius of the looped and/or frame-shaped antenna is less than 2.7 cm.

6. The near-field RFID antenna as claimed in claim 5, wherein the radius of the looped and/or frame-shaped antenna is less than or equal to 1.9 cm.

7. The near-field RFID antenna as claimed in claim 1, wherein the looped and/or frame-shaped antenna is formed so as to be circular, oval, square, rectangular or n-polygonal with portions assembled in a straight or curved manner.

8. The near-field RFID antenna as claimed in claim 1, wherein the terminating resistor corresponds to the line impedance.

9. The near-field RFID antenna as claimed in claim 1, wherein the wave resistance of the strip conductor is approximately 50 ohms, in a substrate consisting of or using FR4 and/or using a substrate having a dielectric constant $\in_r$ of between 4.0 and 4.7.

10. The near-field RFID antenna as claimed in claim 1, wherein the terminating resistor is provided on the upper side of the dielectric and is connected to the ground surface, which is provided on the underside of the dielectric, via one or more through-contacts or connecting lines.

11. The near-field RFID antenna as claimed in claim 1, wherein the terminating resistor is separated in a recessed region from the ground surface and is connected to the ground surface via one or more lines and wherein the opposite connection side of the terminating resistor is connected to one end of the strip conductor, which is located on the upper side on the dielectric, via at least one line or via a through-contact.

12. The near-field RFID antenna as claimed in claim 1, wherein the spacing between the start and the end of the strip conductor is less than 10%, in particular less than 8%, 7%, 6%, 5%, 4%, 3%, 2% or less than 1% of the total length of the strip conductor.

* * * * *